(12) United States Patent
Song et al.

(10) Patent No.: US 8,915,605 B2
(45) Date of Patent: Dec. 23, 2014

(54) LIGHT SOURCE MODULE AND BACKLIGHT UNIT HAVING THE SAME

(71) Applicant: Samsung Display Co., Ltd., Yongin (KR)

(72) Inventors: Hee-Kwang Song, Suwon-si (KR); Dong-Hwan Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 5 days.

(21) Appl. No.: 13/777,894

(22) Filed: Feb. 26, 2013

(65) Prior Publication Data

US 2014/0111972 A1 Apr. 24, 2014

(30) Foreign Application Priority Data

Oct. 18, 2012 (KR) .......................... 10-2012-0115723

(51) Int. Cl.
*G09F 13/04* (2006.01)
*F21V 9/00* (2006.01)
*F21V 8/00* (2006.01)

(52) U.S. Cl.
CPC . *F21V 9/00* (2013.01); *G09F 13/04* (2013.01); *G02B 6/0068* (2013.01); *G02B 6/0051* (2013.01)

USPC .......................................... 362/97.1; 362/293

(58) Field of Classification Search
CPC ...................................... F21V 9/08; F21V 9/00
USPC ............................................................ 362/293
See application file for complete search history.

(56) References Cited

U.S. PATENT DOCUMENTS

| | | | |
|---|---|---|---|
| RE27,473 E * | 8/1972 | Mauer | 359/360 |
| 7,614,774 B2 * | 11/2009 | Ho et al. | 362/612 |
| 2010/0061078 A1 * | 3/2010 | Kim | 362/84 |
| 2012/0170277 A1 * | 7/2012 | Tamura et al. | 362/296.02 |

* cited by examiner

*Primary Examiner* — Evan Dzierzynski
(74) *Attorney, Agent, or Firm* — Innovation Counsel LLP

(57) ABSTRACT

A light source module includes a receiving container, a light source disposed in the receiving container and a filter filtering the light produced from the light source. A backlight unit includes a plurality of light source modules. The plurality of light source modules include a first light source module with a filter and a second light source module alternately disposed with the first light source module. The filter includes a substrate, a transparent layer disposed on the first metal layer and a second metal layer disposed on the transparent layer. The filter transilluminating light of specific area is disposed on the light source module. Thus, the backlight unit having high color reproducibility may be manufactured.

15 Claims, 5 Drawing Sheets

310 370 320 300

530
520
510
500

LIGHT SOURCE MODULE AND BACKLIGHT UNIT HAVING THE SAME

CROSS-REFERENCE TO RELATED APPLICATION

This application claims priority to Korean Patent Application No. 10-2012-0115723, filed on Oct. 18, 2012, and all the benefits accruing therefrom under 35 U.S.C. §119, the contents of which are herein incorporated by reference in their entireties.

BACKGROUND OF THE INVENTION

1. Field of the Invention

Exemplary embodiments of the present invention relate to a light source module and a backlight unit having the light source module. More particularly, exemplary embodiments of the present invention relate to multiple light source modules with multiple filters and a backlight unit having the multiple light source modules with multiple filters.

2. Description of the Related Art

Nowadays, large screen LCD apparatus, such as television, include backlight unit having red-green-blue (RGB) light-emitting diodes (LEDs) for displaying images having high color reproducibility are being developed. The LCD apparatus requires an image having high color reproducibility and satisfying the requirements of the Adobe RGB color space, which is a standard color space made by Adobe Systems Incorporated, U.S.A.

The color ranges displayed by monitors, digital printers, printing press, etc., are limited. The limited color range displayed by a digital device is defined as a color space.

The Adobe RGB color space includes a broad color range. Particularly, the Adobe RGB color space includes broad color ranges corresponding to green and blue colors. The Adobe RGB color space is employed in printers, scanners, digital cameras, monitors, etc.

When the Adobe RGB color space is used in image data, a monitor is required to display an image of the wide color range to support the Adobe RGB color space, thereby displaying the image having required colors. Accordingly, the requirements for satisfying the Adobe RGB color space in the LCD apparatus having the LEDs have become even more important.

To meet the requirements of high color reproducibility, a backlight unit uses light sources including blue light-emitting diode with red phosphor and green light-emitting diode. But, the backlight unit can only cover 95% of the Adobe RGB. Accordingly, manufacturing the backlight unit satisfying the requirements of high color reproducibility is being recognized as an important issue.

BRIEF SUMMARY OF THE INVENTION

Exemplary embodiments of the present invention provide a light source module with filter.

Exemplary embodiments of the present invention also provide a backlight unit including the light source module to improve color reproducibility.

In an exemplary embodiment of a light source module according to the present invention, the light source module includes a receiving container, a light source disposed in the receiving container and a filter filtering the light produced from the light source.

In the exemplary embodiment, the filter may include a glass substrate, a first metal layer disposed on the substrate and including silver, a transparent layer disposed on the first metal layer and a second metal layer disposed on the transparent layer and including silver.

In the exemplary embodiment, the transparent layer may be a zinc sulfide.

In the exemplary embodiment, the light source may be a blue LED with a red phosphor, and the filter may be attached on a LED chip including the receiving container and the light source using a thermosetting resin.

In the exemplary embodiment, the light source may be a blue LED with a red phosphor and the filter is attached on a LED chip including the receiving container and the light source using a thermosetting resin.

In an exemplary embodiment of a backlight unit includes a plurality of light source modules. And each of the light source modules include a first light source module with a filter and a second light source module alternately disposed with the first light source module.

In the exemplary embodiment, the first light source module may include a blue LED and a red phosphor disposed on the blue LED.

In the exemplary embodiment, the filter may have a transmission area which is equal to or greater than 630 nm and equal to or less than 660 nm In the exemplary embodiment, the filter may be attached on a LED chip including the receiving container and the light source using a thermosetting resin.

In the exemplary embodiment, the second light source module may include a filter.

In the exemplary embodiment, the filter of the second light source module may have a transmission area which is equal to or greater than 510 nm and equal to or less than 540 nm.

According to the light source module and a backlight unit having the light source module, a filter transilluminating light of specific area is disposed on the light source module. Thus, the backlight unit having high color reproducibility may be manufactured.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the present invention will be explained in detail with reference to the accompanying drawings.

Figure 1:
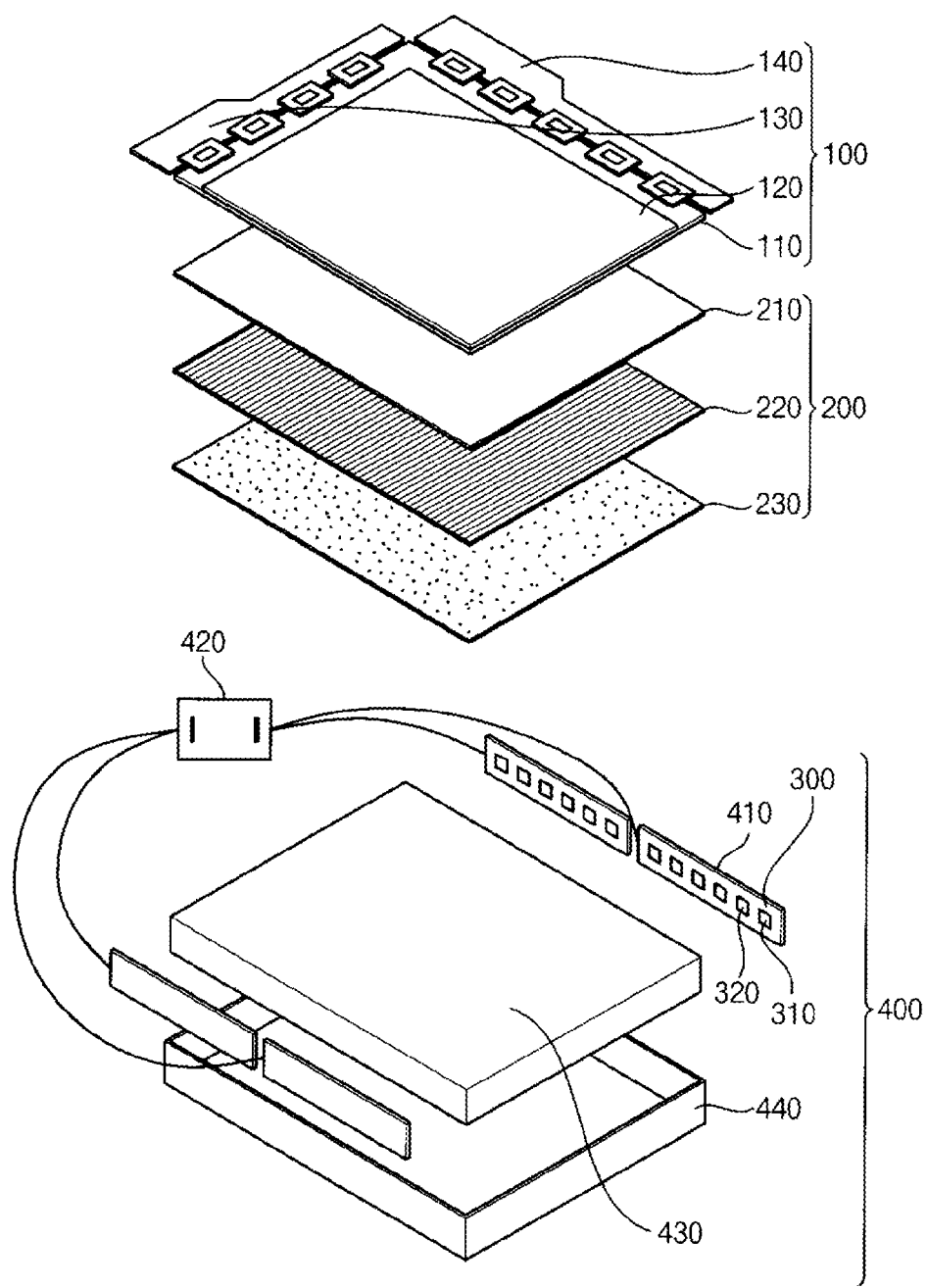
FIG. 1 is an exploded perspective view illustrating a display apparatus according to an exemplary embodiment of the present invention.

FIG. 1 is an exploded perspective view illustrating a display apparatus according to an exemplary embodiment of the present invention.

Referring to FIG. 1, the display apparatus includes a display panel 100, a light adjusting part 200, and a backlight assembly 400 having a light source part 410.

The display panel 100 displays images. The display panel 100 includes a first substrate 110, a second substrate 120, a liquid crystal layer (not shown in figures), a gate driver 130 and a data driver 140.

The first substrate 110 may be a thin film transistor substrate on which a thin film transistor is disposed. The second substrate 120 faces the first substrate 110. The second substrate 120 may be a color filter substrate on which a color filter is disposed. The liquid crystal layer (not shown) is disposed between the first and second substrates 110 and 120.

The gate driver 130 and the data driver 140 are connected to the first substrate 110 and output driving signals to the first substrate 110. The drivers 130 and 140 may respectively include a flexible printed circuit ("FPC"), a driving chip mounted on the FPC, and a printed circuit board ("PCB") connected to the FPC.

In one exemplary embodiment, for example, the display panel 100 may have a rectangular shape, having a long side and a short side.

The light adjusting part 200 may include a protecting sheet 210, a prism sheet 220, a diffusion sheet 230 and so on.

The protecting sheet 210 protects the prism sheet 220 from damages, such as scratches. The prism sheet 220 may include a plurality of prisms disposed at a uniform interval. Each of the prisms may have a triangular prism cross-sectional shape. The prism sheet 220 condenses a light diffused by the diffusion sheet 230 in a direction substantially perpendicular to the display panel 100. The diffusion sheet 230 includes a base substrate and a coating layer disposed on the base substrate. The coating layer may include a bead. The bead may have a globular shape. The diffusion sheet 230 diffuses a light provided from the backlight assembly so that luminance uniformity may be improved.

The first and the second light source modules 310 and 320 may include a light emitting diode ("LED") chip and a phosphor. The first and the second light source modules 310 and 320 will be explained in detail with reference to FIGS. 2A to 2C.

The backlight assembly 400 includes a light source part 410, a light source driver 420, a light guide plate 430 and a bottom chassis 440.

In the light source part 410, a plurality of the first and the second light source modules 310 and 320 are disposed. The light source part 410 generates light to output the light to the light guide plate 430. The light source part 410 may be disposed along the long side of the display panel 100. In the illustrated exemplary embodiment, although the light source part 410 is disposed along both sides of the display panel 100 facing each other, the light source part 410 may be disposed along a single side of the display panel 100. Alternatively, the light source part 410 may be disposed along both of the long and short sides of the display panel 100. In the present exemplary embodiment, the light source part 410 is disposed facing the side surface of the light guide plate 430. However, in another exemplary embodiment, the light source part 410 may be disposed facing the lower surface of the light guide plate 430.

The light source driver 420 is electrically connected to the light source part 410 to drive the light source part 410. The light source driver 420 may include a voltage generator (not shown) and a balancing circuit (not shown). The voltage generator generates a driving voltage to drive a plurality of the first and the second light source modules 310 and 320 in the light source part 410. The balancing circuit controls a current flowing through the first and the second light source modules 310 and 320 having a uniform level.

The light guide plate 430 guides light generated from the light source part 410. The light guide plate 430 may include a rectangular shape or a wedge shape in a cross-sectional view.

The bottom chassis 440 is disposed under the light guide plate 430 and receives the display panel 100, the light adjusting part 200, the light source part 410 and the light guide plate 430. The light source driver 420 may be disposed outside the bottom chassis 440. The light source driver 420 may be disposed under a lower surface of the bottom chassis 440.

Figure 2A:
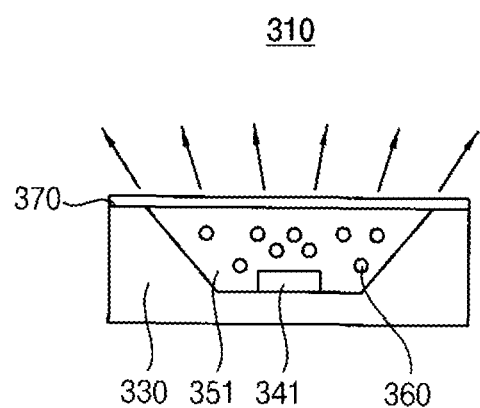
FIG. 2A is a cross-sectional view illustrating a first light source module with a filter.
Figure 2B:
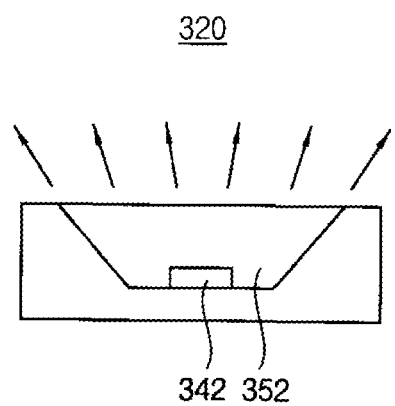
FIG. 2B is a cross-sectional view illustrating a second light source module.
Figure 2C:
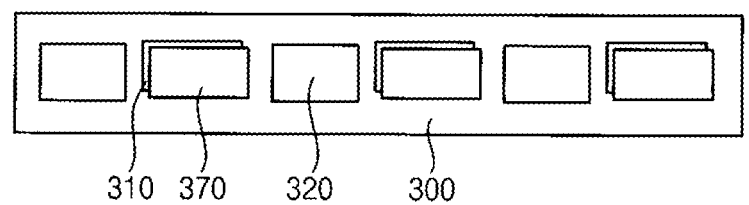
FIG. 2C is a plan view illustrating a substrate including a first light source module with a filter and a second light source module.

FIG. 2A is a cross-sectional view illustrating a first light source module 310 with a filter 370. FIG. 2B is a cross-sectional view illustrating a second light source module 320. FIG. 2C is a plan view illustrating a substrate 300 including a first light source module 310 with a filter 370 and a second light source module 320.

Referring to FIGS. 2A to 2C, a backlight unit according to an exemplary embodiment of the present invention includes a substrate 300, a plurality of first light source modules 310, a plurality of second light source modules 320 and a plurality of filters 370 disposed a plurality of first or second light source modules 310 and 320. The substrate 300 extends in a longitudinal direction. The plurality of first light source modules 310 are disposed along the longitudinal direction on the substrate 300. The plurality of second light source modules 320 are alternately disposed with the plurality of the first light source modules 310. The plurality of second light source modules 320 are disposed in the same line in which the plurality of the first light source modules 310 is disposed on the substrate 300. The filters 370 are attached to the plurality of the first or the second light source modules 310 or 320 using a thermosetting resin.

The plurality of the first light source modules 310 on the substrate 300 according to an exemplary embodiment of the present invention may includes a receiving container 330, a light source, a first light source 341 and a second light source 342, disposed in the receiving container 330 and first and second sealing members 351 and 352 covering the light source. A phosphor 360 is disposed in the first sealing member 351 included in the plurality of first light source modules 310. The first light source 341 of the plurality of first light source modules 310 emits a light of a first color. The phosphor 360 of a second color is disposed in the first sealing member 351. The second light source 342 of the plurality of second light source modules 320 emit light of a third color.

The first light source 341 is disposed in the first light source module 310. The first light source 341 produces light of the first color. The light of a first color may be blue. For example, the first light source 341 may be a blue light emitting diode chip. In the present exemplary embodiment, the first light source 341 may include a blue light emitting diode chip.

The second light source 342 is disposed in the second light source module 320. The second light source 342 produces light of a third color. The light of the third color may be green.

For example, the second light source 342 may be a green light emitting diode chip. In the present exemplary embodiment, the second light source 342 may include a green light emitting diode chip.

Although it is not illustrated in the figures, an electrode part for driving the first and the second light sources 341 and 342 may be disposed in the receiving container 330. The first and the second light sources 341 and 342 may connected to the electrode part formed in the receiving container 330 by a connecting line.

The first sealing member 351 is formed on the first light source 341, so that the first sealing member 351 covers an upper surface and side surfaces of the first light source 341. The second sealing member 352 is formed on the second light source 342, so that the second sealing member 352 covers an upper surface and side surfaces of the second light source 342.

The phosphor 360 emitting light of the second color is disposed in the first sealing member 351. The second color may be red. The phosphor 360 may be a nitride phosphor or an oxynitride phosphor. The phosphor 360 may be evenly distributed in the first sealing member 351. In another exemplary embodiment, the phosphor 360 may be distributed partially concentrated in the first sealing member 351. For example, the phosphor 360 may be densely distributed adjacent to the upper surface of the first sealing member 351.

The first sealing member 351 may include a methyl silicon resin, a phenyl silicon resin and an epoxy resin.

In a method of forming the first sealing member 351, the red phosphor is mixed with a methyl silicon resin, a phenyl silicon resin and an epoxy resin using a mixer. The mixed resin is degassed using a degasser. The degassed resin is dispensed on the first light source 341 using a dispenser.

The second sealing member 352 is formed on the second light source 342, so that the second sealing member 352 covers an upper surface and side surfaces of the second light source 342. The phosphor is not disposed in the second sealing member 352.

The second sealing member 352 may include a methyl silicon resin, a phenyl silicon resin or an epoxy resin.

In a method of forming the second sealing member 352, the methyl silicon resin, the phenyl silicon resin or the epoxy resin is dispensed on the second light source 342 using a dispenser.

The filter 370 may transmit light having a specific wave length range. For example, a high-pass filter that passes high-frequency signals but attenuates signals with frequencies lower than the cutoff frequency or a low-pass filter that passes low-frequency signals but attenuates signals with frequencies higher than the cutoff frequency may be manufactured.

The filter 370 according to an exemplary embodiment of the present invention may transmit light having wavelength of equal to or greater than 630 nm and equal to or less than 660 nm. This filter may transmit red light and decrease a full width at half maximum (FWHM) of the red light. The filter 370 according to an exemplary embodiment of the present invention may transmit light having wavelength of equal to or greater than 420 nm and equal to or less than 500 nm. This filter may transmit blue light.

Figure 3:
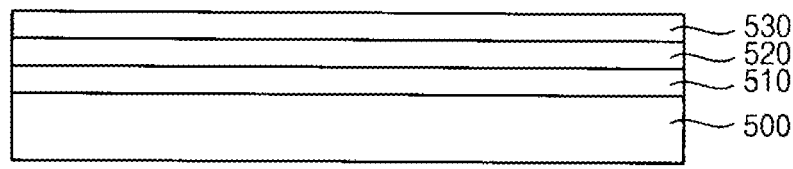
FIG. 3 is a cross-sectional view illustrating an exemplary embodiment of a filter included in a light source module according to the present invention.

FIG. 3 is a cross-sectional view illustrating an exemplary embodiment of a filter included in a light source module according to the present invention.

Referring to FIG. 3, the filter according to an exemplary embodiment of the present invention may include a first metal layer 510, a transparent layer 520 and a second metal layer 530 sequentially stacked on a substrate 500. After the first metal layer 510 is deposited on the substrate 500 by a sputtering process or a chemical vapor deposition process, the transparent layer 520 is deposited on the first metal layer 510 by a sputtering process of a chemical vapor deposition process. Then, the second metal layer 530 is deposited on the transparent layer 520 by a sputtering process a chemical vapor deposition process. The substrate 500 may be a glass substrate. The first and the second metal layer 510 and 530 may include silver. The transparent layer 520 formed between the first metal layer 510 and the second metal layer 530 may include zinc sulfide.

After the first metal layer 510, the transparent layer 520 and the second metal layer 530 are sequentially formed on a substrate 500, the substrate 500 is cut in accordance with sizes of the first light source module 310 and the second light source module 320. Because the substrate 500 may be damaged in the process of cutting the substrate 500, the thickness of the substrate 500 may preferably be more than 0.3 mm.

The filters cut in accordance with size of the first light source module 310 and the second light source module 320 are attached to the first light source module 310 and the second light source module 320 using the thermosetting resin. The thermosetting resin may prevent the filter from detachment from the first and the second light source modules caused by heat emitted from the light sources.

Hereinafter, an effect of the light source module according to one exemplary embodiment will be described in further detail with reference to specific experimental examples.

Figure 4:
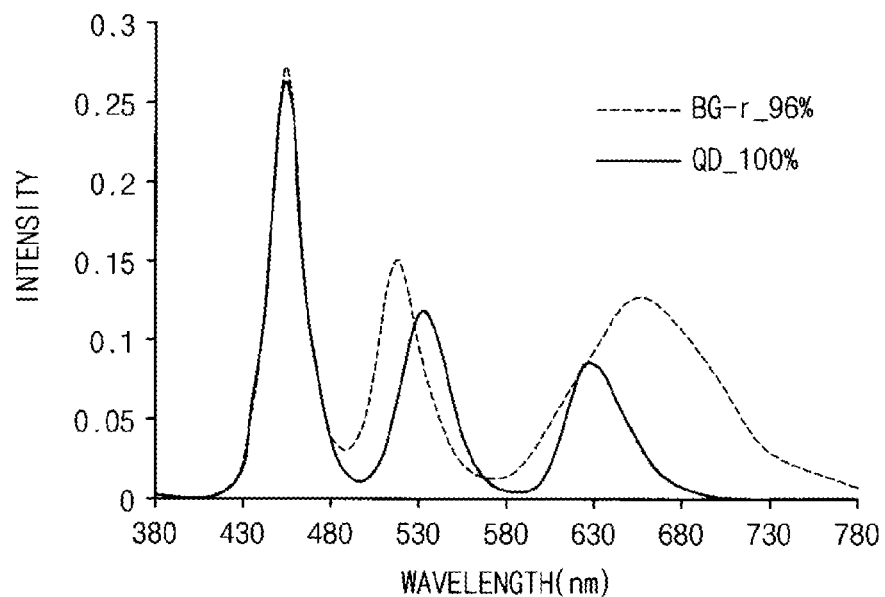
FIG. 4 is a graph illustrating a spectrum of a quantum dot light emitting diode and a spectrum of a backlight unit including a light source module with a blue light emitting diode with a red phosphor and a light source module with a green light emitting diode.

FIG. 4 is a graph illustrating a spectrum of a quantum dot light emitting diode and a spectrum of a backlight unit including a light source module having a blue light emitting diode with a red phosphor and a light source module having a green light emitting diode.

Referring to FIG. 4, a spectrum of a quantum dot light emitting diode known as satisfying Adobe RGB 100% (QD__100%) and a spectrum of a backlight unit including a light source module having a blue light emitting diode with a red phosphor and a light source module having a green light emitting diode (BG-r__96%) showed a different spectrum. A full width at half maximum (FWHM) of green color was 32 nm for both QD__100% and BG-r__96%. The wave length of a red PEAK was 630 nm for QD__100% and 660 nm for BG-r__96%, respectively. A full width at half maximum (FWHM) of red was 92 nm for BG-r__96% and 32 nm for QD__100%, respectively. Therefore, when the full width at half maximum (FWHM) of red color is adjusted as 32 nm, although the value of the red PEAK is 630 nm, the Adobe RGB 100% may be satisfied.

Figure 5:
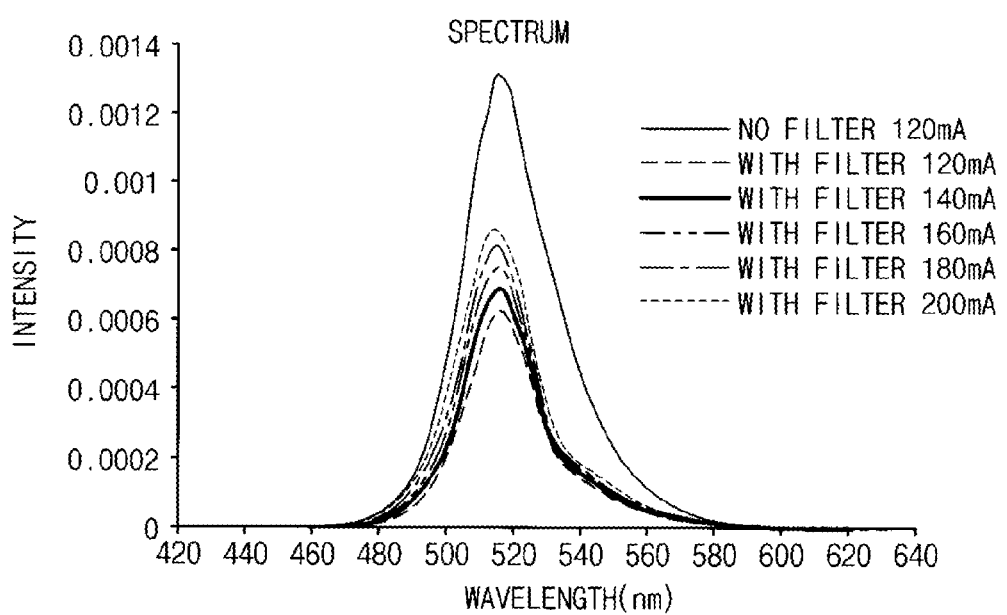
FIG. 5 is a graph illustrating a spectrum of a light source module with a filter and a spectrum of a light source module without a filter.

FIG. 5 is a graph illustrating a spectrum of a light source module with a filter and a spectrum of a light source module without a filter.

Referring to FIG. 5, when a filter having a transmission area equal to or greater than 510 nm and equal to or less than 540 nm attached to the light source module, a decreasing of the full width at half maximum (FWHM) according to the intensity of the light is represented.

Curves in FIG. 5 illustrates a spectrum of the 120 mA light emitting diode without filter and spectrums of the light emitting diode with filter according to the intensity of the light. Referring to FIG. 5, when the filter was attached to the light source module, a decreasing of the full width at half maximum (FWHM) was represented.

Table 1 represents a Luminous Flux (lm), a full width at half maximum (FWHM), a value of Cx and a value of Cy according to various LEDS.

TABLE 1

|  | Iv(mA) | lm | FWHM | Cx | Cy |
|---|---|---|---|---|---|
| No filter | 120 | 23.0 | 31 | 0.145 | 0.722 |
| With filter | 120 | 9.6 | 25 | 0.143 | 0.716 |
|  | 140 | 10.60 | 25.70 | 0.1400 | 0.7126 |
|  | 160 | 11.55 | 26.05 | 0.1379 | 0.7088 |
|  | 180 | 12.41 | 26.39 | 0.1364 | 0.7049 |
|  | 200 | 13.21 | 26.76 | 0.1354 | 0.7009 |

Above data were results of using the filter having a transmission area of equal to or greater than 510 nm and equal to or less than 540 nm. However, if the transmission area is adjusted, a same result may be obtained for different colors.

For example, when a filter having a transmission area of equal to or greater than 630 nm and equal to or less than 660 nm attached to the red light source module, a decreasing of the full width at half maximum (FWHM) according to the intensity of the light may be obtained.

When the filter is attached to the light source module, the full width at half maximum (FWHM) is decreased. Therefore, when the filter having an appropriate transmission area is attached to the first light source module or the second light source module, the Adobe RGB 100% may be achieved.

Figure 6:
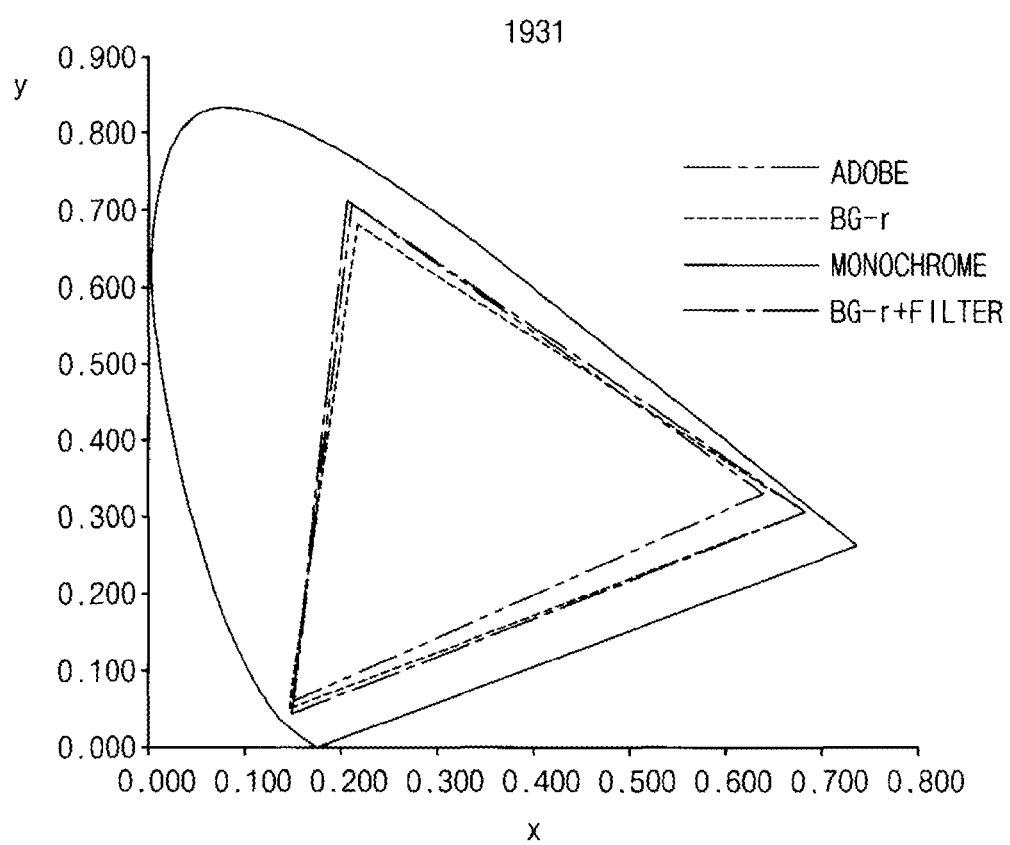
FIG. 6 is a graph illustrating whether a light source module with a filter or a light source module without a filter satisfies Adobe 100% on the distribution of chromaticity of CIE 1931 color space.

FIG. 6 is a graph illustrating whether a light source module with a filter or a light source module without a filter satisfies Adobe 100% on the distribution of chromaticity of CIE 1931 color space.

Referring to FIG. 6, a spectrum of the back light unit is represented. When the filter is not attached, all area is not covered in the distribution of chromaticity of CIE 1931 color space. However, when the filter is attached, all area is covered in the distribution of chromaticity of CIE 1931 color space.

Table 2 represents achievement ratio of Adobe RGB depending on whether the filter is attached in the CIE 1931 color space and the CIE 1976 color space.

TABLE 2

|  | No filter | | With filter | |
|---|---|---|---|---|
|  | CIE 1931 | CIE 1976 | CIE 1931 | CIE 1976 |
| R | 0.684 | 0.307 | 0.684 | 0.306 |
| G | 0.216 | 0.683 | 0.205 | 0.714 |
| B | 0.146 | 0.051 | 0.149 | 0.045 |
| achievement ratio of Adobe(%) | 96.6 | 99.1 | 100 | 100 |

According to the result of the experiment example, when the filter is not attached, an achievement ratio of Adobe RGB represents 96.6% and 99.1% with respect to the CIE 1931 color space and the CIE 1976 color space, respectively. However, when the filter is attached, an achievement ratio of Adobe RGB represents 100% with respect to the CIE 1931 color space and the CIE 1976 color space.

According to the present exemplary embodiment, a filter transilluminating light of specific area is disposed on the light source module. Thus, the backlight unit having high color reproducibility may be manufactured.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A light source module comprising:
   a receiving container;
   a light source disposed in the receiving container; and
   a filter attached to the receiving container and filtering the light produced from the light source, wherein the filter comprises:
      a glass substrate;
      a first metal layer disposed on the substrate and including silver;
      a transparent layer disposed on the first metal layer, the transparent layer being a zinc sulfide; and
      a second metal layer disposed on the transparent layer and including silver.

2. The light source module of claim 1,
   wherein the light source is a blue LED with a red phosphor, and
   wherein the filter is attached to the receiving container using a thermosetting resin.

3. The light source module of claim 1, wherein the filter selectively transmit light having wavelength between 630 nm and 660 nm.

4. The light source module of claim 1,
   wherein the light source is a blue LED with a red phosphor, and
   wherein the filter is attached to the receiving container using a thermosetting resin.

5. The light source module of claim 4, wherein the filter selectively transmit light having wavelength between 420 nm and 500 nm.

6. A backlight unit comprising:
   a plurality of light source modules, wherein each of the light source modules comprises:
      a first light source module with a filter, wherein the filter comprises:
         a glass substrate;
         a first metal layer disposed on the substrate and including silver;
         a transparent layer disposed on the first metal layer, the transparent layer being a zinc sulfide; and
         a second metal layer disposed on the transparent layer and including silver; and
      a second light source module alternately disposed with the first light source module.

7. The backlight unit of claim 6, wherein the first light source module comprises a blue LED and a red phosphor disposed on the blue LED.

8. The backlight unit of claim 7, wherein the filter selectively transmit light having wavelength between 630 nm and 660 nm.

9. The light source module of claim 8, wherein the filter is attached to the receiving container using a thermosetting resin.

10. The light source module of claim 7, wherein the filter is attached to the receiving container using a thermosetting resin.

11. The backlight unit of claim 6, wherein the filter selectively transmit light having wavelength between 630 nm and 660 nm.

12. The light source module of claim 11, wherein the filter is attached to the receiving container using a thermosetting resin.

13. The light source module of claim 6, wherein the filter is attached to the receiving container using a thermosetting resin.

14. The backlight unit of claim 6, wherein the second light source module further comprises a filter.

15. The backlight unit of claim 14, wherein the filter selectively transmit light having wavelength between 510 nm and 540 nm.

* * * * *